United States Patent [19]

Stephan

[11] Patent Number: 4,662,046
[45] Date of Patent: May 5, 1987

[54] POWER TRANSMISSION

[75] Inventor: Robert W. Stephan, Northville, Mich.

[73] Assignee: Vickers, Incorporated, Troy, Mich.

[21] Appl. No.: 275,949

[22] Filed: Jun. 22, 1981

[51] Int. Cl.[4] .......................................... F04O 18/344
[52] U.S. Cl. .............................. 29/156.4 R; 29/557;
72/324; 228/165; 228/174; 418/268
[58] Field of Search ...................... 29/156.4 R, 557;
72/324; 228/165, 174; 418/268

[56] References Cited

U.S. PATENT DOCUMENTS

| 2,358,304 | 9/1944 | Cogsdill | 72/324 |
| 2,623,727 | 12/1952 | McLeod | 29/156.8 R |
| 3,421,413 | 1/1969 | Adams | 418/82 |
| 3,437,965 | 4/1969 | Radsdale | 29/157.3 R |
| 3,978,570 | 9/1976 | Winter | 29/156.4 R |
| 3,988,079 | 10/1976 | Ounsted | 29/156.4 R |

FOREIGN PATENT DOCUMENTS 710611   6/1965   Canada ................................ 418/269

OTHER PUBLICATIONS

Van Cleave, David A., "The Electron Beam At Work in Detroit," Jan. 1978.

Primary Examiner—Carlton R. Croyle
Assistant Examiner—Jane E. Obee
Attorney, Agent, or Firm—Barnes, Kisselle, Raisch, Choate, Whittemore & Hulbert

[57] ABSTRACT

A method of making a rotor of a fluid energy translating device wherein the rotor has an annular passage entirely within the rotor, a plurality of radially extending vane slots intersecting the passage and axial openings intersecting the annular passage. The method comprises forming an annular groove in the periphery of a solid body, closing the open side of the groove to provide the annular passage, forming radial vane slots in the body intersecting the annular passage, and forming axial openings in the body intersecting the annular passage.

5 Claims, 15 Drawing Figures

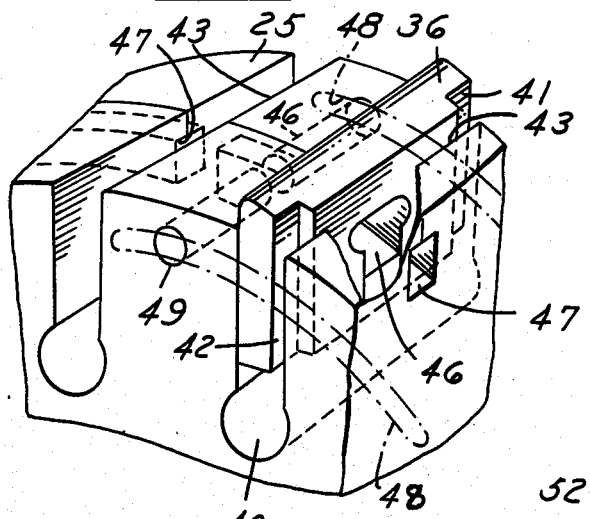
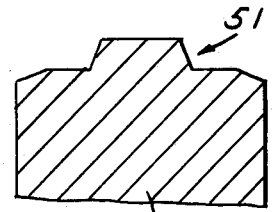
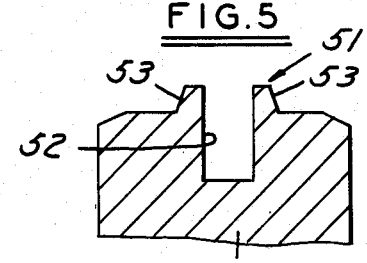
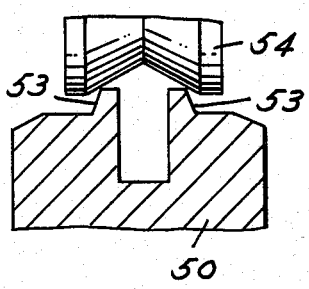
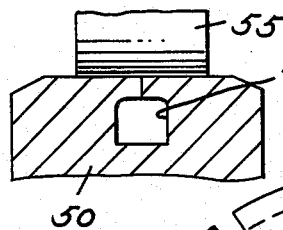
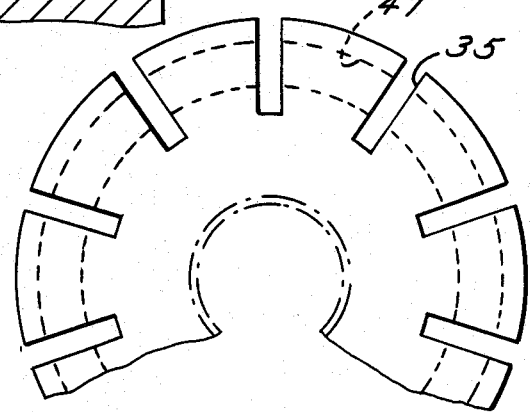
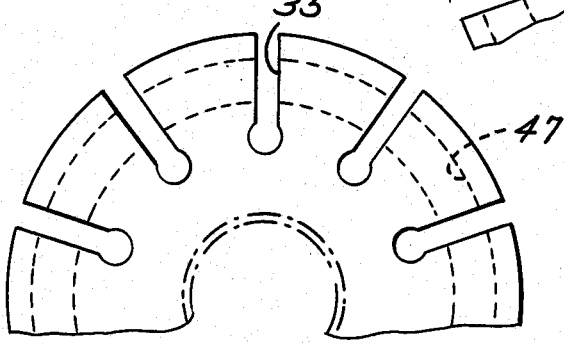

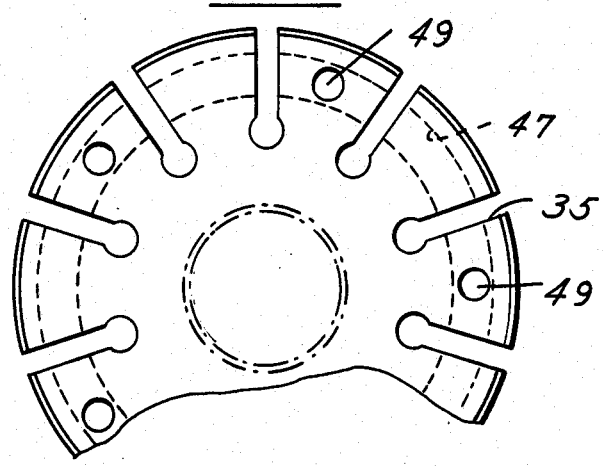
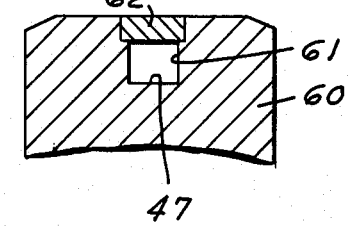
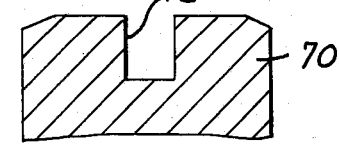
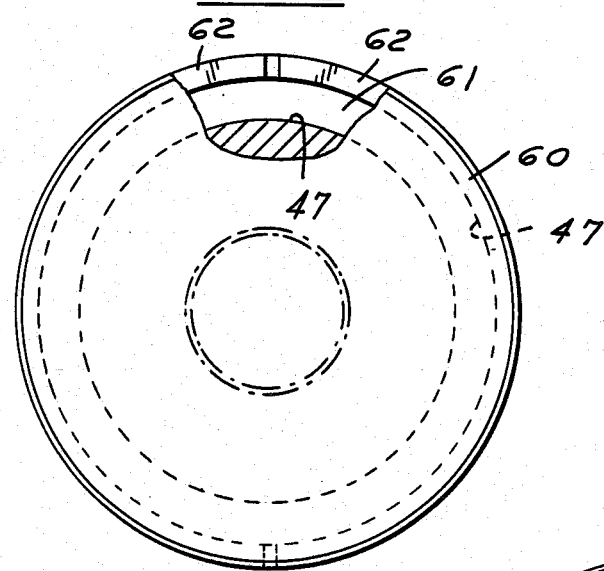
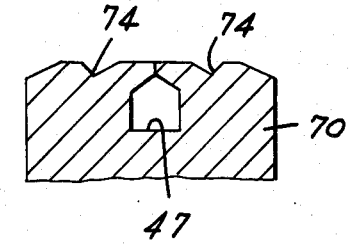
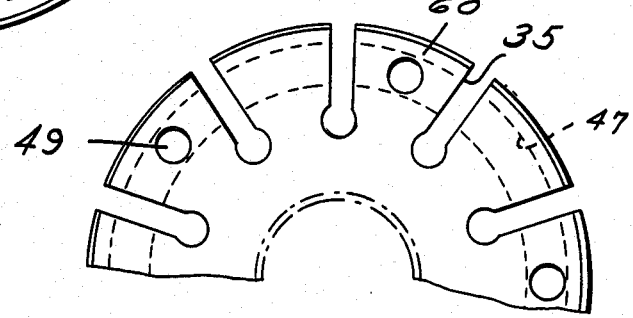

POWER TRANSMISSION

This invention relates to power transmissions and particularly to fluid pressure energy translating devices such as pumps or motors.

BACKGROUND AND SUMMARY OF THE INVENTION

A form of pump and motor utilized in hydraulic power transmission comprises a rotor having a plurality of spaced radial vanes rotatable therewith and slidable relative thereto in slots provided in the rotor. The rotor and vanes cooperate with the internal contour of a cam to define one or more pumping chambers between the outer periphery of the rotor and the cam contour through which the vanes pass carrying fluid from an inlet port to an outlet port. Cheek plates are associated with each side of the cam and rotor through which the fluid flows to and from the rotor.

It has heretofore been recognized that it is essential for efficient operation of the pump to apply pressure to a chamber at the underside or base of the vanes in order to maintain them in contact with the cam. In the past pressure has been applied continuously or intermittently to the undersides of the vanes. In the continuous pressure arrangement, pressure is applied even when the vanes are in low pressure zones and has resulted in excessive cam and vane tip wear. In the intermittent pressure arrangement, pressure is applied to the vanes only when the vanes are in high pressure zones and only centrifugal force is utilized to urge the vanes toward the cam when the vanes are in low pressure zones. As a result the contact of the vanes with the cam is not positive during some portions of the travel so that efficiency is adversely affected.

It has heretofore been suggested and commercial devices have been made wherein additional pressure chambers are associated with each vane. The chamber at the base of each vane is commonly known as the under vane chamber and is subjected to cyclically changing pressure. The additional chambers are commonly known as the intra-vane chambers and are subjected to continuous high pressure. Typical devices are shown in U.S. Pat. Nos. 2,919,651 and 2,967,488. In such an arrangement, the contact of the vanes with the cam is controlled at all times by fluid pressure to the intra-vane and under vane chambers.

In order to feed high pressure fluid to the intra-vane or high pressure chamber, it has been necessary to utilize passages in the cheek plates in the zones of low pressures and axial grooves in the rotor intersecting the vane slots. Since the fluid in these passages and grooves is at a high pressure, the fluid tends to leak through the interface between the cheek plates and rotor to the low pressure zones. In addition, leakage from the intra-vane chamber to the under vane chamber may occur between the vanes and slots due to tilting of the vane in the slot by the forces acting on the vane in a tangential direction.

In order to feed fluid to the under vane chamber from the pumping chambers the rotor is formed with a radial hole extending and intersecting the under vane chamber from the periphery of the rotor between the vane slots. However, with devices of this general type the radial holes in the rotor tend to weaken the rotor at the intersection of the radial hole and the under vane chamber. As a result it has been necessary to limit the maximum pump pressure to avoid rotor failure.

It has heretofore been suggested that the intra-vane chambers be fed with fluid through an internal passage formed entirely within the rotor and that a check valve be associated with each vane to control the flow of fluid to the chambers. A typical arrangement of this type is shown in U.S. Pat. No. 3,223,044.

The present invention is directed to a fluid pressure energy translating device which has increased efficiency and is easier and less costly to manufacture.

In the copending U.S. patent application Ser. No. 275,948 of Harry T. Johnson, filed June 22, 1981, having a common assignee with the present application, a generally annular internal feed passage is formed entirely within the rotor and communicates with the intra-vane pressure chambers. A radial passage along each side of each vane extends from the outer end or tip of each vane to the inner end or base of each vane thereof to supply cyclically changing fluid pressure to the under vane chambers. An arcuate valving groove is formed in each cheek plate alongside the rotor in the high pressure zones and communicates with the radial passages as the rotor rotates. Axial openings in the side of the rotor extend to and intersect the annular passage. The axial openings are adapted to register with the arcuate groove as the rotor rotates relative to the cheek plates to supply fluid under pressure from the radial passages in the vanes through the arcuate grooves and axial openings to the annular passage and, in turn, to the intra-vane chambers.

As shown in U.S. Pat. No. 3,223,044, the rotor is made in two halves, each of which has an annular groove in a radial face so that when the faces of the two halves are brought into contact and joined together, the two grooves face one another to form the annular passage. When a rotor is made in this manner, it is costly, it is difficult to control the joining of the two halves to insure against fluid leakage and the resultant rotor is weak because axial fluid pressure forces acting on the two halves tend to force the halves away from one another.

The present invention is directed to the manufacture of a rotor of a fluid pressure energy translating device which is easier and less costly to manufacture and which results in a rotor that has higher strength.

In accordance with the invention, the method comprises forming an annular groove in the periphery of a solid body, closing the open side of the groove to provide the annular passage, thereafter forming radial vane slots in the body intersecting the annular passage and forming axial openings in the body intersecting the annular passage.

DESCRIPTION OF THE DRAWINGS

FIG. 3 is a fragmentary perspective view of a portion of the pump.

FIGS. 4–10 show successive steps in making the rotor shown in FIG. 2.

FIGS. 11–13 show successive steps in a modified method for forming the rotor shown in FIG. 2.

FIGS. 14–15 show successive steps in another modified method of forming the rotor shown in FIG. 2.

DESCRIPTION

This invention relates to a method of forming a rotor having an annular internal passage formed entirely within the rotor such as shown in U.S. Pat. No. 3,223,044 or the aforementioned copending application of Harry T. Johnson, titled Power Transmission, filed concurrently with this application and having a common assignee with the present application.

Figure 1:
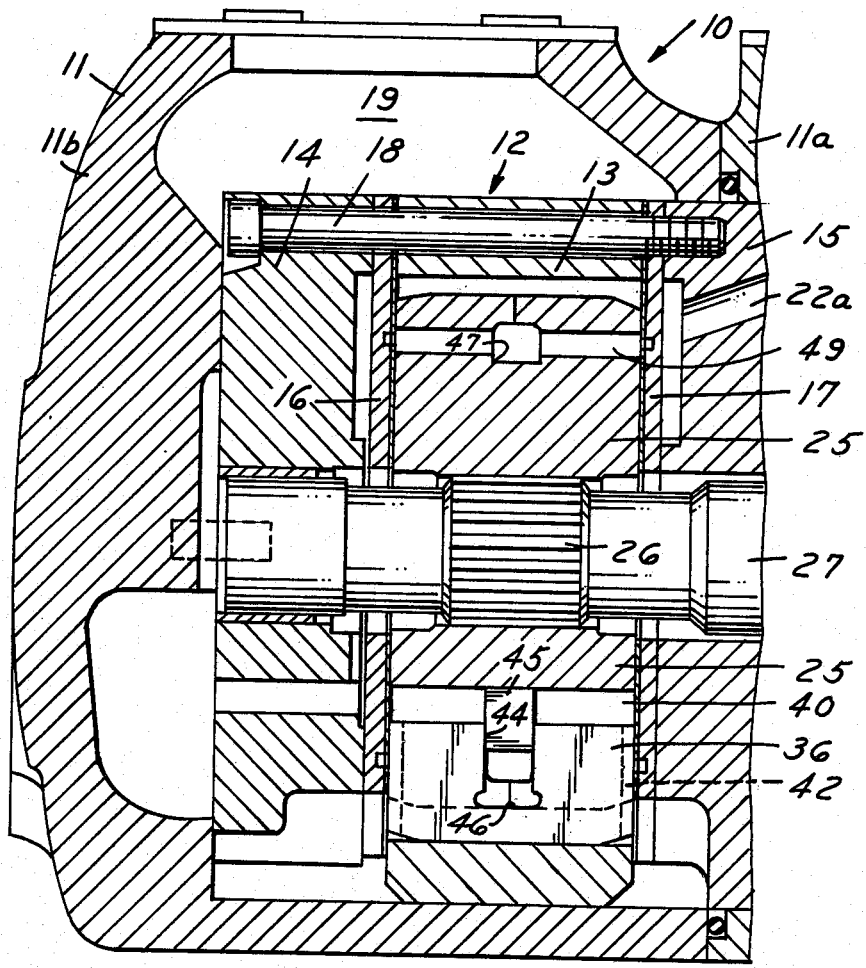
FIG. 1 is a partial longitudinal sectional view through a pump embodying the invention.

As shown in the aforementioned United States patent application and in FIG. 1, a rotary sliding vane device or pump 10 comprises a casing 11 and a cartridge or subassembly 12. Casing 11 includes a body 11a and a cover 11b. The cartridge 12 includes a cam ring 13 sandwiched between support plates 14, 15 with intermediate cheek plates 16, 17 all of which are secured to each other by bolts 18 extending through support plate 14 and cam 13 into threaded holes in support plate 15. The cover 11b is provided with an inlet supply connection port 19 leading to inlet zones of the pump through openings and, passages, not shown, formed in the cam and cheek plates.

An outlet connection port, not shown, is provided in the body 11a which is directly connected by a passage 22a to a fluid discharge chamber formed in support plate 15.

A rotor 25 is rotatably mounted within the cam 13 on the splined portion 26 of a shaft 27 which is rotatably mounted within the casing 11.

Cam 13 has an internal contour which is substantially oval in shape and which together with the periphery of the rotor 25 and the adjoining surfaces of the cheek plates 16, 17 define two opposed pumping chambers each of which has fluid inlet and fluid outlet zones.

Figure 2:
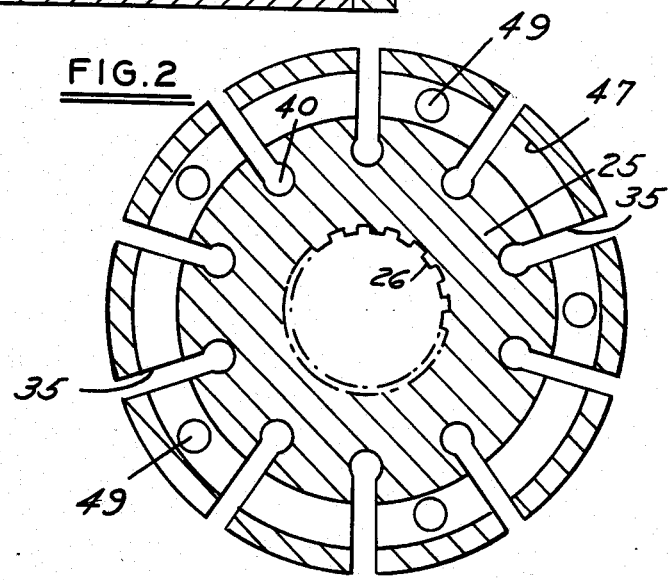
FIG. 2 is a sectional view of a rotor forming a part of the pump shown in FIG. 1.

The pumping device so far described is of the well known structure disclosed in the U.S. Pat. No. 2,967,488. It has been the practice in devices of this type to provide the rotor with a plurality of radial vane slots 35, FIG. 2, each of which has a vane 36, FIG. 1, slidably mounted therein. The outer end or vane tips of vanes 36 engage the inner contour of cam 13. The contour of cam 13 includes an inlet rise portion, an intermediate arc portion, an outlet fall portion, and another arc portion. The cam contour is symmetrical about its minor axis, thus each of the rise, fall and arc portions are duplicated in the other opposed portion of the contour. As the tips of vanes 36 carried by the rotor 25 traverse the inlet rise portions, the vanes 36 move radially outward with respect to the rotor 25, and when the vane tips traverse the outlet fall portions, the vanes 36 move radially inward. The spacing between each pair of vanes 36 is adapted to span the distance between each pair of ports in a manner to provide proper sealing between the inlet and outlet of the pumping device.

Each vane 36 has a rectangular notch 44 extending from the inner end or base of the vane to substantially the mid-section thereof. A reaction member 45 comprises a flat sided blade substantially equal in width and thickness to that of the notch 44 in the vane so as to have a sliding fit within the vane and the side walls of each rotor vane slot 35. The side walls of the rotor vane slot 35, the vane 36 and the reaction member 45 define an expansible intra-vane chamber 46. An under vane chamber 40 is defined by the base of each vane 36 and the base and side walls of each rotor vane slot 35. Chambers 46 and 40 are separated by and sealed from each other by reaction member 45. Thus, the two chambers 46, 40 are substantially the same as shown in U.S. Pat. No. 2,967,488 which is incorporated herein by reference.

The under vane chamber 40, associated with the base of each vane 36, is provided with fluid pressure by radial passages 42 along each side of each vane 36. Passage 42 is defined by a groove 41, FIG. 3, in each of the vane, by a surface 43 of the rotor vane slot 35, and by the surface of cheek plates 16, 17. The radial passages 42 transmit fluid to the under vane chambers 40 and, thus, to the bases of the vanes 36. Thus, the cyclically changing pressure which is exerted on the tips of the vanes 36 as they traverse the inlet and outlet portions of the cam contour is transmitted to the bases of the vanes 36.

An annular closed passage 47 entirely within rotor 25 provides communication between the intra-vane chambers 46.

Axial openings 49 formed in the side of rotor 25 extend to and intersect with the annular passage 47. Fluid under pressure from radial passages 42 is supplied to the annular passage 47 by an arcuate valving groove 48 in each face of each cheek plate 16, 17. The groove 48 extends about a portion of the travel of rotor 25 in the outlet fall or high pressure zone. As the rotor 25 rotates, radial passage 42 communicates through arcuate groove 48 with axial opening 49 and with annular passage 47. Since the vanes 36 are moving radially inward in the outlet fall zone the vanes displace fluid in the under vane chambers through the restriction provided by the radial passages. An elevated fluid pressure gradient is thereby produced in the radial passages. As the radial passages move across the arcuate groove the elevated fluid pressure is transmitted to the intra-vane chambers through the axial openings and the annular passage. The elevated fluid pressure is continuously transmitted to the intra-vane chambers 46 and acts to move the vanes 36 radially outward and hold the reaction members 45 against the base of the under vane chambers 40.

Referring to FIGS. 4–10, in accordance with the invention, rotor 25 is preferably made by machining a cylindrical body 50 on a screw machine or the like. The body 50 is first formed with an axial opening along its centerline, a spline is preferably formed in the axial opening and then the body is mounted for machining utilizing the splined opening as a means for aligning and supporting the body. The body 50 is then machined to form an annular rib 51 on the periphery thereof. Further machining forms an annular groove 52 with spaced projections 53.

The projections 53 are then deformed by cold rolling utilizing successive tools 54, 55 to close the open side of the groove and thus form the internal annular passage 47. The projections 53 are formed into sufficient fluid tight relation to maintain hydraulic pressure in the annular passage 47.

The radial vane slots 35 and intersecting axial under vane chamber openings 40 are then machined at circumferentially spaced points for receiving the vanes. Axial openings 49 which intersect the annular passage 47 are machined through the body as by drilling. The axial openings 49 may be formed prior to or after the formation of the radial slots and prior to or after forming and closing groove 52.

After carburizing and case hardening, a final machining of the slots is made preferably by grinding.

Inasmuch as three sides of the internal passage 47 are formed in the rotor body and the fourth side is formed by deforming the projections 53, fluid pressure forces acting in the direction of the rotor axis do not act on any joint surface. The stresses in deformed projections 53 due to radially outward fluid pressure are of very low magnitude because of the short length of the deformed projections resulting in a rotor of high strength.

In another embodiment of the invention as shown in FIGS. 14 and 15 a modified rotor 70 is formed by machining an annular groove 72 in the body of the rotor and the material on either side 74 of groove 72 is upset so as to close the opening of groove 72 into sufficient fluid tight relation so as to maintain hydraulic pressure in annular passage 47 formed by the closing thereof.

In the method as shown in FIGS. 11–13, a modified rotor is formed from a body 60 by first machining an annular groove 61. One or more segments 62 are inserted in the groove 61 and bonded to the side walls of the groove to define the annular passage 47. The ends of the segments are spaced from one another to form locating points 62a at which two of the slots are then formed. The axial openings 49 are formed by drilling either before or after the radial slots are formed.

The bonding of the segments is preferably achieved by welding although brazing may also be used.

In this form, the welded surfaces are limited to the area of the internal passage and do not extend along the entire surface of a rotor half. As a result, the need for pressure-tight fused connections at the base of the vane slots and other high pressure points in the rotor is eliminated. Moreover, visual inspection of the welds from the outer diameter is possible and adequate. As in the aforementioned method of the invention, since three sides of the internal passage are formed in the single rotor body, the fluid pressure forces in the direction of the rotor axis do not react on any joint connection. The stresses due to radially outward fluid pressure on the joined surfaces are of a very low magnitude resulting in a high strength rotor assembly.

Each of the methods is such that high volume production of the rotor is possible.

What is claimed is:

1. The method of making a rotor of a fluid energy translating device which comprises
   forming an axial center opening in a solid body,
   formiing an annular groove in the periphery of said body,
   closing the open side of said groove to provide an annular passage entirely within the body to provide a fluid pressure seal at said open side,
   thereafter forming radial slots in the periphery of said body intersecting said annular passage, and
   forming axial openings in said body intermediate said slots intersecting said annular passage.

2. The method set forth in claim 1 wherein said step of closing said open side of said groove comprises positioning at least one segment in said groove and bonding said segment to the side walls of said groove to form the annular passage.

3. The method set forth in claim 1 wherein said step of closing said open side of said groove comprises forming integral radially extending projections in said body and thereafter deforming said projections axially toward one another and radially inwardly to close the open side of said groove and provide a fluid pressure seal.

4. The method set forth in claim 3 wherein said step of forming said projections is performed prior to said step of forming said groove.

5. The method set forth in claim 3 wherein said step of deforming is performed by cold forming to provide a fluid pressure seal of said open side.

* * * * *